Jan. 19, 1943.   C. A. SOLINSKI   2,308,787
INDICATING MECHANISM FOR AMUSEMENT DEVICES
Filed May 31, 1941
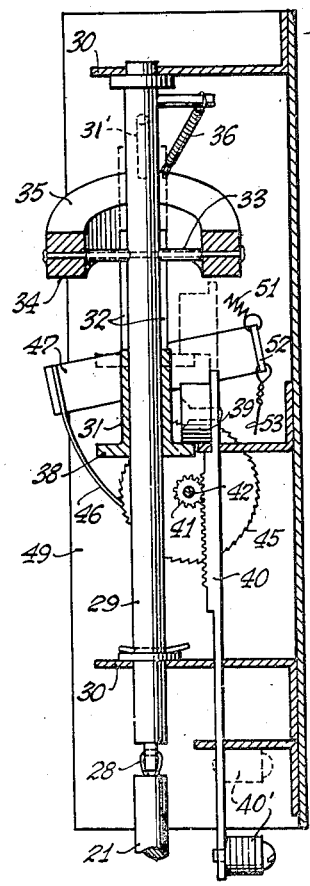
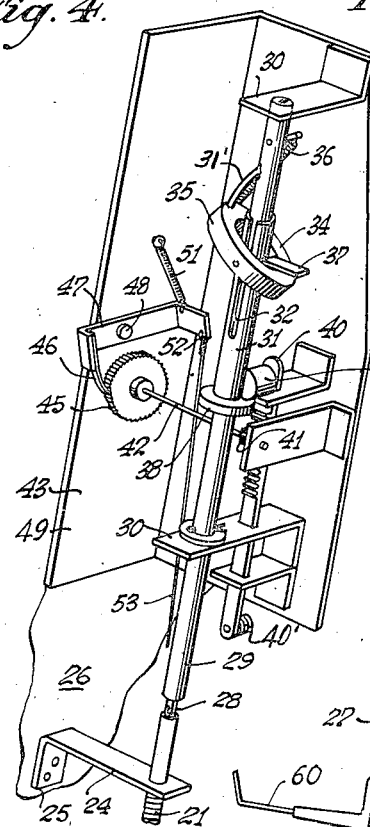
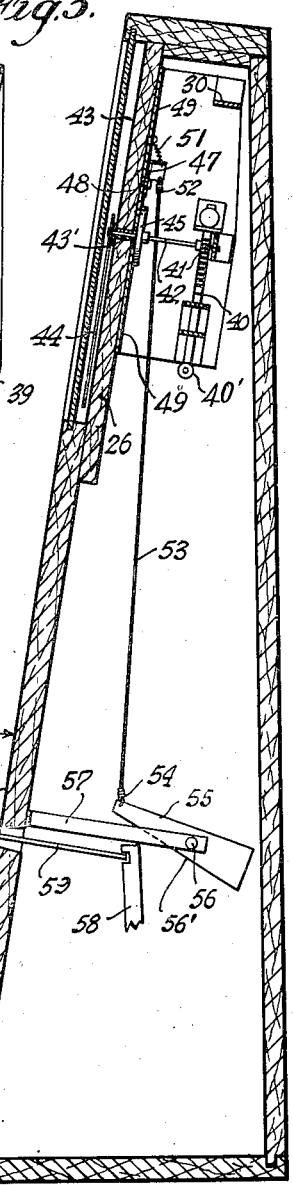
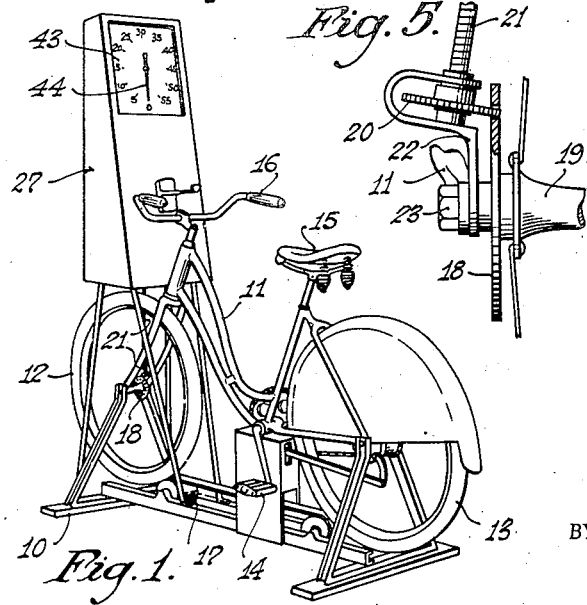
Charles A. Solinski
INVENTOR.
BY Clarence E. Threedy
HIS ATTORNEY.

Patented Jan. 19, 1943

2,308,787

UNITED STATES PATENT OFFICE 2,308,787

INDICATING MECHANISM FOR AMUSEMENT DEVICES

Charles A. Solinski, Chicago, Ill., assignor to The Exhibit Supply Company, Chicago, Ill., a corporation of Illinois Application May 31, 1941, Serial No. 396,053

1 Claim. (Cl. 264—20)

This invention relates to certain novel improvements in a coin-controlled exercising device particularly and more specifically a stationary bicycle, and has for its principal object the provision of an improved construction of this character which will be highly efficient in use and economical in manufacture.

More specifically the salient objects of the invention reside in the provision of means for indicating the speed at which the bicycle is operating, so that the operator thereof may observe from time to time the maximum speed.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a perspective view of the invention;

Fig. 2 is a vertical sectional detail view of the indicator cabinet embodied in the invention;

Fig. 3 is a perspective view of the speed indicating mechanism;

Fig. 4 is a fragmentary part sectional vertical detail view of the same;

Fig. 5 is a fragmentary detail view of a torque take-off associated with the front wheel hub structure.

Referring to the drawing, a stand is indicated at 10 and this stand supports a bicycle 11 of ordinary construction comprising front and rear wheels 12 and 13 respectively, pedal-driving means 14, a seat 15, and handle bars 16.

The wheels 12 and 13 frictionally engage a tread mill 17 acting as a means for retarding the rotation of the wheels 12 and 13 to simulate the travel of a bicycle upon a road.

The present invention is concerned with indicating the speed of travel of the bicycle, and in this connection I provide a torque take-off gear 18 mounted upon the hub 19 of the front wheel 12 and operatively meshing with a speed gear 20 mounted on the lower end portion of a flexible shaft 21 and supported by a suitable bracket 22 mounted upon the axle 23 of the front wheel hub 19. This flexible shaft 21 at its upper end is supported by a bracket 24 secured as at 25 to a wall 26 of a cabinet 27. The shaft 21 has universal connection as at 28 with a shaft 29 journaled through suitable bearing brackets 30.

The shaft 29 projects through a sleeve 31 having opposite elongated slots 32 formed therein, the sleeve 31 being slidable longitudinally upon the shaft 29. Adapted to move in these slots 32 are the pins 33 of a gyrometer 34 comprising the usual gyrometer ring 35 pivotally supported by the pins 33 and yieldably resisted in one direction by means of a spring 36 into abutment with a stop 31' extending from the sleeve 31 and movable therewith.

The gyrometer ring 35 engages a lug 37 carried by the sleeve 31. The lower end portion of the sleeve 31 has an annular shoulder 38 which engages a laterally disposed roller 39 carried by a substantially vertically movable rack bar 40. This rack bar 40 carries a weight 40' at its lower end and meshes with a pinion 41 carried by a shaft 42 extending through a hub structure 42' suitably supported in the wall 26 and a numeral-bearing dial 43. Connected to the shaft 42 is a pointer or hand 44 movable over the face of the dial. On the shaft 42 adjacent the inside face of a mounting plate 49 is mounted a ratchet wheel 45 adapted to be engaged by a latch finger 46 carried by a lever 47 pivotally mounted as at 48 upon the plate 49, mounted in a suitable manner within the cabinet 27. The opposite end of the shaft 42 is suitably supported on a bracket 49' extending parallel to the plate 49 from a flange portion thereof.

A spring 51 having one end anchored on the plate 49 and its opposite end attached to the lever 47, resists movement of the lever 47 in one direction. Secured to this lever 47 as at 52 is a pull cord 53, the lower end of which is connected as at 54 to a beveled plate 55 pivoted as at 56 to the front wall of cabinet 27 through the medium of the bar 57. The brake release rod 58 (not included as a part of this invention) normally has engagement with the inner end portion of a slide member 59 of a coin slide 60 of a well-known type.

The arrangement is such that upon rotation of the flexible shaft 21, the gyrometer ring 35 in a manner well-known in the art will be caused to assume a position toward the horizontal, and in doing so the projection or lug 37 will be engaged to elevate the sleeve 31, whereupon the rack bar 40 is moved vertically, and in this movement rotates the shaft 42, which in turn rotates the pointer 44 to indicate the speed upon the numeral-bearing dial 43.

The shaft 42 is releasably held from returning to its normal position by the latch finger 46 until released thereby so that the dial will indicate the maximum speed attained. Release of the shaft 42 for return to normal position is accomplished by moving the coin slide 59 inwardly after depositing a suitable coin therein, bringing the inner end portion of the slide member 59 into engagement with the edge 56' of the plate 55 whereby this plate 55 is pivoted in an anticlockwise direction, exerting a pulling force upon the lever 47 against the action of the spring 51, releasing the latch finger 46 from its hold on the ratchet 45 to permit the shaft 42 and pointer 44 to rotate to zero position by the weight of the rack bar 40 and its weight 40'.

The arrangement herein described provides a simple and efficient means for indicating the speed at which the bicycle normally would be traveling if upon a road.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In a speed indicator for a coin-controlled exercising bicycle comprising a cabinet providing a numeral bearing dial, a hand movable over the dial, a horizontal shaft for said hand arranged in said cabinet at right angle to said dial, a pinion on said horizontal shaft, a rack engaging said pinion and arranged for vertical movement relative thereto, a gyrometer comprising a vertical shaft mounted for rotation in said cabinet and having driving connection with a wheel of the bicycle, a slotted sleeve arranged on said vertical shaft for movement therealong, a gyrating ring arranged on said shaft and pin means extending through the slotted portion of said sleeve for mounting said ring on said shaft for gyrating movement and permitting vertical movement of said sleeve, spring means normally urging said gyrating ring into a tilted position, a lug on said sleeve and engageable by said ring and adapted to raise the sleeve commensurate with the gyrating position of said ring, an annular collar on said sleeve, and roller means carried by said rack and engaged by said collar for raising said rack to impart movement to said movable hand.

CHARLES A. SOLINSKI.